Patented Aug. 22, 1939

2,170,262

UNITED STATES PATENT OFFICE 2,170,262

DERIVATIVES OF DYESTUFFS CONTAINING HYDROXYL GROUPS AND PROCESS OF MAKING SAME

Charles Graenacher, Basel, Franz Ackermann, Binningen, near Basel, and Heinrich Bruenger, Basel, Switzerland, assignors to the firm of Society of Chemical Industry in Basle, Basel, Switzerland No Drawing. Application July 23, 1936, Serial No. 92,244. In Switzerland August 17, 1935

15 Claims. (Cl. 260—192)

The present invention relates to a new process for converting dyestuffs containing hydroxyl groups into new valuable preparations which are characterized by an increased solubility in water. The invention comprises the new process, as well as the new derivatives of dyestuffs containing hydroxyl groups obtainable according to the new process.

It has been found that new derivatives of dyestuffs containing hydroxyl groups, which are distinguished from the initial dyestuffs by an increased solubility in water, may quite generally be obtained by causing these dyestuffs to react with acylating agents which derive from organic acids containing more than one salt-forming group, which group itself is selected from the group consisting of carboxyl groups and sulfonic groups.

The dyestuff derivatives thus obtained correspond to the general formula

$$R_1-O-R_2$$

wherein $R_1$ represents the radical of a dyestuff containing at least one hydroxyl group, and $R_2$ represents an acyl radical containing at least one salt-forming group selected from the group consisting of carboxyl groups and sulfonic groups. These new products are characterized by the solubility of their salts in water, and by the property of regenerating the more sparingly soluble parent dyestuffs corresponding to the radical $R_1$, merely by the action of saponifying agents.

The dyestuffs serving as parent material for this process must contain at lesat one hydroxyl group. The process is particularly valuable when applied to insoluble to sparingly soluble dyestuffs, i. e. to dyestuffs in the production of which components are used which contain no, or only few, groups lending solubility, for example carboxyl or sulfonic groups. In the case of the azo-dyes, at least one of the components used for producing the dye must contain a hydroxyl group or an enolizable keto group.

If azo-dyes are used, they may belong to the mono-, dis- or polyazo-series. They may, for example, be produced from diazotized aromatic amines of the benzene or naphthalene series which may contain substituents, for example hydroxyl groups, and suitable coupling components, for example arylamines, phenols or compounds having methylene groups capable of coupling. Azo-dyes may also advantageously be used in the production of which at least one component lending affinity to vegetable fibers has been used. Such components are for example diphenyl, stilbene, thiazole, diarylazoxy- and carbazole derivatives, as well as amines bound by urea, thiourea, diazine, triazine, benzoyl and cinnamoyl radicals, and further certain aminonaphthols. The azo-dyes serving as parent materials may also contain metals in complex union, such as chromium, copper, iron, nickel or cobalt.

Also dyes of classes other than the azo-dyes are suitable for this process, for example dyes of the anthraquinone series having a hydroxyl group, and hydroxyl derivatives of suitable dyes of the azine, oxazine, thiazine, arylmethane and rhodamine series or the like. In this case also the dyes may be synthesized in such manner that they contain groups which increase their affinity to vegetable fibers.

Acylating agents deriving from organic acids which contain more than one salt-forming group selected itself from the group consisting of carboxyl groups and sulfonic groups, are for example halides of aliphatic, hydroaromatic or aromatic carboxylic acids which contain sulfonic groups or carboxyl groups. These groups can be transformed after the action of the acylating agents on the dye into water-soluble metal salts or ammonium salts. As examples of acylating agents deriving from organic acids which contain more than one salt-forming group selected itself from the group consisting of carboxyl groups and sulfonic groups, there may be mentioned halides of polycarboxylic acids, such as for example benzene-1:3:5-tricarboxylic acid, benzene hexacarboxylic acid, and polysulfonic acids, such as for example 1:3-benzene-disulfonic acid, 1:3:6-naphthalenetrisulfonic acid; further there are quite particularly suitable halides of sulfo-carboxylic acids in which both the sulfonic group and the carboxyl group are in the form of their halides, and those in which only the sulfonic groups or only the carboxyl groups are in the form of their halides. Examples of such compounds are the halides of the sulfobenzoic acids, of the sulfonaphthoic acids, of the sulfo-acetic acid, and the like.

The acylation can be carried out by the usual methods, such as by heating the dyestuffs with the acylating agents with or without the addition of agents which bind acid, or preferably in the presence of tertiary bases, particularly pyridine, or also indifferent solvents. For carrying out the reaction the halides of the above mentioned acids or the analogues thereof need not be isolated. On the contrary, the reaction product of a phosphorous halide, such as for example phosphorous trichloride or pentachloride, on the corresponding acids may be used directly. One may also proceed in such a manner that a solution of the dyestuff containing hydroxyl groups and the polyvalent acid is treated in the tertiary base with phosphorous pentachloride or phosphorous trichloride.

The derivatives obtainable by the invention give valuable transformation products, and can be used for dyeing the most varied materials, for example vegetable fibers, animal fibers, such as wool, silk, leather, or artificial fibers, such as regenerated cellulose or cellulose derivatives, and artificial masses.

They are more or less readily soluble in water. Their aqueous solutions or suspensions may be used for dyeing and printing any desired material in such a manner that the goods, after having been dyed, padded or printed by known processes, are subjected to a saponifying treatment for example with alkalis or agents developing basic substances, such as ammonia, sodium carbonate, caustic soda solution, trisodium phosphate or alkali acetate, whereby the dye initially acylated is fixed as a pigment on the material, and in particular is rendered fast to washing. The saponification of the acylated dyestuffs can also be effected in lacquers and artificial masses. In many cases the treatment with saponifying agents can be applied in the dyeing operation.

If dyes are used which can form metallic complexes, a treatment with a compound yielding a metal can be applied before, during or after the saponification on the fiber, in the dye bath, in lacquers and artificial masses or to the dye in substance, whereby a metalliferous pigment is deposited on the fiber or in the material, or the dye in substance is converted into a metalliferous pigment.

In contradistinction to the soluble acyl derivatives of the leuco-compounds of vat dyes, the derivatives produced by this invention need no oxidising agent for their development.

As mentioned above, the present invention is applicable to all dyestuffs containing OH-groups. It is particularly valuable with dyestuffs which due to their sparing solubility cannot be dyed as such. Such dyestuffs are for example the insoluble azo-dyestuffs consisting for example of diazo compounds which contain in addition to the diazonium group no group capable of rendering the dye soluble, and such coupling components which contain neither sulfonic groups nor carboxyl groups. Products of this kind are for example phenol, particularly the hydroxy compounds of the benzene series which couple with diazo compounds in ortho-position to the OH-group, such as cresol, chlorocresol, α- and β-naphthols, and the substitution products thereof which contain no sulfonic or carboxyl groups, and in which the substituents are arranged in the molecule in such a manner that the azo-group enters in ortho-position to the OH-group. Such coupling components are for example the amides from naphthol or aminonaphthol-sulfonic acids and secondary amines, the sulfones corresponding to the naphthol or aminonaphthol-sulfonic acids, and the like.

As products which are of particular interest for the present process there may be mentioned the azo-dyestuffs from the above mentioned hydroxy compounds of the benzene series which couple in ortho-position to the OH-group and such diazotized aminoazo-dyestuffs which, in addition to the diazonium group, contain no group capable of rendering the dye soluble. Such diazo compounds are for example diazotized ortho-aminoazo-toluene or tetrazotized 4:4'-diamino-5-methoxy-3-methyl-azobenzene.

Reference is also made to the fact that according to the present process valuable products can further be obtained from sulfonated dyestuffs. In this connection there may be mentioned for example the sparingly soluble sulfonated dyestuffs containing hydroxyl groups which are fixed to the fiber for example by further diazotizing and developing with β-naphthol or phenylmethylpyrazolone, or by developing with diazotized para-nitranilines or also after-developing with metal salts. Thus, according to the present process, otherwise useless dyestuffs such as are obtained by combining diazotized aniline, diazotized xylidine or diazotized β-naphthylamine, or tetrazotized 3:3'-diaminodiphenyl-methane with one mole or two moles of the 2-(3'-aminobenzoyl)-amino-5-hydroxynaphthalene-7-sulfonic acid, diazotizing or tetrazotizing the dyestuff thus obtained again, and combining it with β-naphthol, resorcin or phenylmethylpyrazolone, can easily be converted into water-soluble dyestuffs which dye the fiber well and which regenerate the sparingly soluble fast dyestuffs on the fiber by a simple treatment with mildly acting saponifying agents.

The following examples illustrate the invention, the parts being by weight:—

*Example 1*

6 parts of the azo-dye produced from 1-amino-naphthalene and 2-hydroxynaphthalene are dissolved by boiling in the necessary quantity of pyridine, and 7.2 parts of the dichloride of meta-sulfobenzoic acid are added. The solution, which soon becomes dark brown, is kept at the boil for 2 hours. The main part of the pyridine is then distilled in a vacuum and the residue of the distillation is triturated with ether. The acylated product is deposited in the form of crystals, which are filtered and purified by re-precipitation by ether from an alcoholic solution. A brown powder, soluble in hot water is obtained, which after adding alkali to the hot solution, reverts to the parent dye.

*Example 2*

2.5 parts of the azo-dye formed by coupling tetrazotized 4:4'-diamino-1:1'-diphenyl and 2-hydroxynaphthalene are dissolved by boiling in the necessary quantity of pyridine, and 3.2 parts of the dichloride of meta-sulfobenzoic acid are then poured in. A test portion separated from the solution after a short time and poured into water no longer yields the parent dye, but, after stirring, becomes a perfectly clear solution. When this point is reached the main part of the pyridine is distilled in a vacuum and the residue of the distillation is triturated with ether. The acylated derivative separates in the form of crystals which are filtered and purified by boiling with alcohol. A red powder soluble in water is obtained which reverts to the parent dye on adding alkali to the hot aqueous solution.

*Example 3*

10 parts of benzoic acid-meta-sulfochloride are dissolved by warming in 30 parts of pyridine. After cooling to 30° C. during which the addition compound crystallizes, 5 parts of the pure re-crystallized product obtained by coupling diazotized 1-amino-naphthalene and 2-hydroxynaphthalene are added, and the mixture is heated gradually to 70° C. with continual stirring. After about 3 hours the reaction is complete and the product gives a perfectly clear orange-red solution in hot water. On adding alkali the parent dye separates completely.

Example 4

19.2 parts of 3:5-benzoic acid disulfochloride are mixed with 100–120 parts of pyridine, and to the warm mixture 12 parts of the azo-dye produced by coupling diazotized 1-aminonaphthalene and 2-hydroxynaphthalene are added. The mixture is quickly heated to about 70–90° C. and stirred well. After a short time the reaction is complete, and a test portion of the solution immediately dissolves to a clear solution in cold water. The main part of the pyridine is now distilled in a vacuum, the residue of the distillation is dissolved in a little water, and the product is precipitated by pouring into cold saturated brine. After filtration, the precipitate may be purified by extracting with alcohol. The purified product is very readily soluble in cold water, and reverts to the unchanged parent dye on addition of dilute alkali.

Example 5

9.6 parts of 3:5-benzoic acid disulfochloride are added to 40–60 parts of pyridine and 5 parts of the azo-dye obtained by coupling tetrazotized 4:4'- diamino-1:1'- diphenyl and 2 - hydroxynaphthalene are added. The mixture is quickly heated to 70–90° C. while stirring. The reaction is complete after 15–30 minutes, and the product is readily soluble in cold water. After distilling the pyridine in a vacuum, the product is obtained in solid form by dissolving in a little water and precipitating with a saturated common salt solution.

The product is a brown powder which is very readily soluble in water and quickly reverts to the parent dye on addition of dilute alkali.

Example 6

6 parts of the azo-dye obtained by coupling diazotized 1-naphthylamine and β-naphthol are heated to 80–90° C. with 100 parts of pyridine and 10 parts of 5-sulfosalicylic acid dichloride for an hour. The product is largely freed from pyridine by evaporation in a vacuum and is dissolved in water and salted out. By extracting the product with methyl alcohol it can be further purified becoming a red-brown powder. By heating the yellow-red aqueous solution with dilute alkali the insoluble red parent dye separates.

A similar result is obtained by using disulfosalicylic acid trichloride.

Example 7

2.9 parts of the azo-dye obtained by coupling diazotized acetyl-para-phenylenediamine and the anilide of 2-benzoylamino-5-hydroxynaphthalene-7-sulfonic acid, 50 parts of pyridine and 3.3 parts of benzoic acid sulfochloride are heated together for an hour at 80–90° C., whereupon the product gives a clear solution in water. The pyridine is largely distilled in a vacuum and the residue of the distillation is dissolved in water, salted out, filtered and dried. The salt is removed by extraction with methyl alcohol, and the product readily dissolves in water to an orange-red solution. On adding dilute alkali to the solution the parent dye separates.

Example 8

12 parts of the azo-dye obtained from 2-amino-4-chlorophenol and β-naphthol are together stirred with 120 parts of pyridine at 60–65° C. A warm solution of 10 parts of cupric acetate in 100 parts of pyridine is slowly poured into the mixture, and the latter is then left standing for some time. As soon as no further change of the color tone of the mixture towards Bordeaux can be observed (after about 30 minutes), the mixture is poured into ice water, whereby the copper complex is precipitated in the form of a violet solid mass. This is filtered, washed with water and dried.

13 parts of the copper complex produced as described are scattered into a mixture of 15 parts of benzoic acid-3:5-disulfochloride and 100 parts of pyridine at 40–50° C. The mixture is stirred for 10 minutes at 80–85° C., whereby the original violet changes gradually to yellow-brown. The reaction is complete when a test portion dissolves to a clear solution in cold water. The pyridine is distilled in a vacuum and the residue of the distillation is dissolved in warm water, and solid sodium chloride is added. The acylated derivative separates in brown flakes. These are filtered, washed with brine, dried and if necessary extracted with methyl alcohol, whereby the salt is removed. The acylated copper complex is readily soluble in water to a yellow-brown solution, and can be readily saponified by dilute alkali to give the original copper complex which is insoluble in water.

The following table gives the particulars of further products which can be produced by this invention:—

|    | Azo-dyestuff | Acylating agent | Color of aqueous solution |
|----|---|---|---|
| 1  | Aniline ⟶ α-naphthol | Benzoic acid-3:5-disulfochloride | Yellow. |
| 2  | Aniline ⟶ 2:4-dihydroxyquinoline | do | Do. |
| 3  | α-Naphthylamine ⟶ barbituric acid | do | Do. |
| 4  | 4-methoxy-1-aminobenzene ⟶ para-cresol | do | Orange. |
| 5  | Dianisidine ⟶ β-naphthol | Sulfosalicylic acid-dichloride | Yellow. |
| 6  | 4-amino-azobenzene ⟶ β-naphthol | Benzoic acid-3:5-disulfochloride | Brown. |
| 7  | 3:3'-diaminobenzanilide ⟶ β-naphthol | do | Orange-red. |
| 8  | 4-amino-azobenzene ⟶ β-naphthol | Benzoic acid-3-sulfochloride | Orange. |
| 9  | 3:3'-diaminobenzanilide ⟶ para-cresol | do | Orange-red. |
| 10 | 4:4'-diaminodiphenylcarbamide ⟶ β-naphthol | Benzoic acid-3:5-disulfochloride | Yellow. |
| 11 | 4:4'-diaminodiphenylcarbamide ⟶ 1-hydroxy-4-benzoylnaphthalene | do | Red. |
| 12 | 4-chlorbenzene-azo-1'-amino-3'-methylnaphthalene ⟶ β-naphthol | Benzoic acid-3:5-disulfochloride | Do. |
| 13 | do | Benzoic acid-3:5-disulfochloride | Brown-red. |
| 14 | 2-methyl-4:4'-diamino-5-methoxy-azobenzene ⟶ β-naphthol | do | Brown. |
| 15 | 2-methyl-4:4'-diamino-5-methoxy-azobenzene ⟶ β-naphthol | do | Do. |
| 16 | 2-methyl-4:4'-diamino-5-methoxy-azobenzene ⟶ para-cresol | do | Red-brown. |
| 17 | do | Benzoic acid-3-sulfochloride | Bordeaux. |
| 18 | 4-amino-4'-acetylamino-2'-paratoluene-sulfone-azobenzene ⟶ β-naphthol | Benzoic acid-3:5-disulfochloride | Do. |
| 19 | 4:4'-diaminodiphenylamine ⟶ β-naphthol | Benzoic acid-3-sulfochloride | Red. |
| 20 | 4-aminoacetanilide ⟶ anilide of 2-acetylamino-5-hydroxynaphthalene-7-sulfonic acid. | do | Orange-red. |
| 21 | 4-aminoacetanilide ⟶ anilide of 2-phenylamino-5-hydroxynaphthalene-7-sulfonic acid. | do | Do. |

| | Azo-dyestuff | Acylating agent | Color of aqueous solution |
|---|---|---|---|
| 22 | 4:4'-diamino-2-methyl-5-methoxy-azobenzene → anilide of 2-benzoylamino-5-hydroxynaphthalene-7-sulfonic acid. | Benzoic acid-3-sulfochloride | Violet. |
| 23 | α-Naphthylamine → anilide of 2-benzoylamino-5-hydroxynaphthalene-7-sulfonic acid. | ...do... | Yellow-red. |
| 24 | α-Naphthylamine → anilide of 2-acetylamino-5-hydroxynaphthalene-7-sulfonic acid. | ...do... | Red. |
| 25 | α-Naphthylamine → anilide of 2-phenylamino-5-hydroxynaphthalene-7-sulfonic acid. | Benzoic acid-3-sulfochloride | Brown-red. |
| 26 | Ortho-anisidine → 1-hydroxy-4-benzoylnaphthalene | Benzoic acid-3:5-disulfochloride | Orange-red. |
| 27 | Aminoazotoluene → 1-hydroxynaphthalene-4-benzylsulfone | ...do... | Red-violet. |
| 28 | 4-chloraminophenol → resorcine | ...do... | Brown. |
| | Dehydrothiotoluidine → | ...do... | Yellow-brown. |
| 29 | Ortho-aminoazotoluene → para-cresol | ...do... | Do. |
| 30 | Ortho-aminoazotoluene → 1-hydroxy-3-chloro-4-methylbenzene | Benzoic acid-3-sulfochloride | Brown. |
| 31 | Ortho-aminoazotoluene → β-naphthol | Benzoic acid-3:5-disulfochloride | Do. |
| 32 | ...do... | 1-benzoylamino-3-benzenecarboxylic acid-3':5'-disulfochloride | Orange. |
| 33 | ...do... | Sulfochlor-acetic acid chloride | Brown. |
| 34 | Ortho-aminoazotoluene → para-cresol | 1:3:6-naphthalenetrisulfonic acid-chloride | Orange. |
| 35 | ...do... | Benzoic acid-4-sulfochloride | Brown. |
| 36 | 4-amino-4'-ethoxydiphenylamine → β-naphthol | 1:3:6-naphthalenetrisulfochloride | Brown-red. |
| 37 | 1-amininaphthalene → β-naphthol | 1:3-benzenedisulfone chloride | Orange. |
| 38 | ...do... | 1:3:6-naphthalenetrisulfochloride | Yellow-brown. |
| 39 | Aniline → 1-hydroxy-4-methoxynaphthalene | 1-benzoylamino-3-benzenecarboxylic acid-3':5'-disulfochloride | Orange. |
| 40 | β-Naphthylamine → β-naphthol | 1:3:6-naphthalene-trisulfonic acid-chloride | Do. |
| 41 | ...do... | 2:4-benzoic acid disulfochloride | Brown. |
| 42 | 4:4'-diamino-5-methoxy-2-methylazobenzene → 2-β-naphthol | Benzoic acid-3:5-di...loride | Brown-red. |
| 43 | 4:4'-diamino-5-methoxy-2-methylazobenzene → 1-hydroxy-3-chloro-4-methylbenzene | | Do. |
| 44 | 4-(4'-methyl)-phenoxyacetylamino-2:5-dimethoxy-1-aminobenzene → methylanilide of 2-phenylamino-5-hydroxynaphthalene-7-sulfonic acid | Benzoic acid-3-sulfochloride | Do. |
| 45 | 4-benzoylamino-2:5-diethoxy-1-aminobenzene → 1-hydroxy-3:4-dimethylbenzene | Benzoic acid disulfochloride | Yellow brown. |
| 46 | 1-amino-4:5-phenylazimidobenzene → 1-hydroxy-3:4-dimethylbenzene | Benzoic acid-3:5-disulfochloride | Do. |
| 47 | 1-amino-4:5-phenylazimidobenzene → β-naphthol | Benzoic acid-disulfochloride | Do. |
| 48 | 1-amino-4:5-(4'-chloro)-phenylazimidobenzene → 1-hydroxy-3:4-dimethylbenzene | ...do... | Yellow. |
| 49 | 2-phenyl-5-aminobenzimidazole → 1-hydroxy-3:4-dimethylbenzene | Benzoic acid disulfochloride | Do. |
| 50 | 1:4'-chlorphenyl-2-phenyl-5-aminobenzimidazole → 1-hydroxy-3:4-dimethylbenzene | ...do... | Do. |
| 51 | 1:4'-chlorphenyl-2-phenyl-5-aminobenzimidazole → β-naphthol | ...do... | Do. |
| 52 | 4-amino-3-methoxyazobenzene → para-cresol | Benzoic acid-3:5-disulfochloride | Orange. |
| 53 | 1-amino-2-methoxynaphthalene-4-(4'-chloro)-azobenzene → 1-hydroxy-3-methyl-4-chlorobenzene | ...do... | Dark red. |
| 54 | ...do... | 1:3:6-naphthalene-trisulfochloride | Brown-red. |
| 55 | 2-aminonaphthalene-1-sulfonic acid → β-naphthol | Benzoic acid-3-sulfochloride | Red. |
| 56 | Xylidine → meta-aminobenzoyl-2-amino-5-hydroxynaphthalene-7-sulfonic acid → β-naphthol | Benzoic acid-disulfochloride | Brown-red. |
| 57 | 1-aminonaphthalene-4(2'-methoxy)-azobenzene → β-naphthol | ...do... | Brown. |
| 58 | 1-amino-4-nitrobenzene-2-methyl-sulfone → 1-amino-5-hydroxynaphthalene. | Benzoic acid-metasulfochloride | Do. |
| 59 | 2-naphthylamine-1-sulfonic acid → β-naphthol | Benzoic acid-3-sulfochloride | Orange. |
| 60 | 1-naphthylamine-4-sulfonic acid → anilide of 2:3-hydroxynaphthoic acid. | ...do... | Do. |

| | Other dyestuffs | Acylating agent | Color of aqueous solution |
|---|---|---|---|
| 1 | 1:5-dibenzoyldiamino-4:8-dihydroxyanthraquinone | Benzoic acid-3:5-disulfochloride | Yellow. |
| 2 | 1-hydroxy-4-para-tolylaminoanthraquinone | ...do... | Bordeaux. |
| 3 | 1:5-diamino-4:8-dihydroxyanthraquinone | Benzoic acid-3-sulfochloride | Yellow. |
| 4 | Benzene-2-benzene'-2'-dihydroxydibenzanthrone | ...do... | Brown-violet. |
| 5 | Dihydroxy-N-dihydro-1:2:2':1'-anthraquinonazine | Benzoic acid-3:5-disulfochloride | Olive-brown. |
| 6 | 1:2-dihydroxyanthraquinone | Meta-benzoic acid-sulfochloride | Yellow. |
| 7 | 2:4-dinitrophenyl-1-amino-8-naphthol | ...do... | Do. |

What we claim is:

1. Process for the manufacture of derivatives of dyestuffs containing at least one hydroxyl group, comprising causing dyestuffs which contain no substituents from the group consisting of carboxyl groups and sulfonic groups to react in the presence of pyridine with halides of organic acids which contain more than one salt-forming group selected itself from the group consisting of carboxyl groups and sulfonic groups.

2. Process for the manufacture of derivatives of dyestuffs containing at least one hydroxyl group, comprising causing dyestuffs which contain no substituents from the group consisting of carboxyl groups and sulfonic groups to react in the presence of pyridine with halides of organic acids which contain simultaneously carboxyl groups and sulfonic groups.

3. Process for the manufacture of derivatives of dyestuffs containing at least one hydroxyl group, comprising causing dyestuffs which contain no substituents from the group consisting of carboxyl groups and sulfonic groups to react in the presence of pyridine with halides of aromatic acids selected from the acids of the benzene and naphthalene series which contain simultaneously carboxyl groups and sulfonic groups.

4. Process for the manufacture of derivatives of dyestuffs containing at least one hydroxyl group, comprising causing dyestuffs which contain no substituents from the group consisting of carboxyl groups and sulfonic groups to react in the presence of pyridine with halides of aromatic acids of the benzene series which contain simultaneously carboxyl groups and sulfonic groups.

5. Process for the manufacture of derivatives of dyestuffs containing at least one hydroxyl group, comprising causing dyestuffs which contain no substituents from the group consisting of carboxyl groups and sulfonic groups to react in the presence of pyridine with halides of aromatic acids of the benzene series which contain one carboxyl group and at least one but not more than two sulfonic groups.

6. Process for the manufacture of derivatives of azo-dyestuffs containing hydroxyl groups but containing no substituents from the group consisting of carboxyl groups and sulfonic groups, comprising causing these azo-dyestuffs to react in the presence of pyridine with halides of aromatic acids of the benzene series which contain one carboxyl group and at least one but not more than two sulfonic groups.

7. Process for the manufacture of derivatives of azo-dyestuffs containing hydroxyl groups but containing no substituents from the group consisting of carboxyl groups and sulfonic groups, comprising causing these azo-dyestuffs to react in the presence of pyridine with chlorides of aromatic acids of the benzene series which contain one carboxyl group and at least one but not more than two sulfonic groups.

8. Process for the manufacture of derivatives of azo-dyestuffs from arylides of ortho-hydroxy-carboxylic acids containing neither free sulfonic groups nor free carboxyl groups and diazo compounds containing in addition to the diazonium group no group capable of rendering the dye soluble, comprising causing these azo-dyestuffs to react in the presence of pyridine with chlorides of acids of the benzene series which contain one carboxyl group and at least one but not more than two sulfonic groups.

9. Process for the manufacture of derivatives of azo-dyestuffs from arylides of ortho-hydroxy-carboxylic acids containing neither free sulfonic groups nor free carboxyl groups and diazo compounds containing in addition to the diazonium group no group capable of rendering the dye soluble, comprising causing these azo-dyestuffs to react in the presence of pyridine with chlorides of acids of the benzene series which contain one carboxyl group and two sulfonic groups.

10. Process for the manufacture of derivatives of azo-dyestuffs containing hydroxyl groups which are obtained by combining cresol derivatives which couple in ortho-position to the OH-group and contain neither sulfonic acid groups nor carboxyl groups with diazotized azo-compounds containing in addition to the diazonium group no group capable of rendering the dye soluble, comprising causing these azo-dyestuffs to react in the presence of pyridine with the chloride of the 3:5-disulfobenzoic acid.

11. The ester-like derivatives of dyestuffs of the general formula $$R_1-O-R_2$$

in which $R_1$ represents the radical of a dyestuff containing at least one hydroxyl group, and $R_2$ represents an acyl radical containing at least one salt-forming group from the group consisting of carboxyl groups and sulfonic groups, which products are water-soluble powders which, when treated with mild saponifying agents, regenerate the parent dyestuff corresponding to the radical $R_1$.

12. The ester-like derivatives of dyestuffs of the general formula $$R_1-O-R_2$$

in which $R_1$ represents the radical of a dyestuff containing at least one hydroxyl group but containing neither sulfonic groups nor carboxyl groups, and $R_2$ represents an acyl radical containing at least one salt-forming group from the group consisting of carboxyl groups and sulfonic groups, which products are water-soluble powders which, when treated with mild saponifying agents, regenerate the parent dyestuff corresponding to the radical $R_1$.

13. The ester-like derivatives of azo-dyestuffs of the general formula $$R_1-O-R_2$$

in which $R_1$ represents the radical of an azo-dyestuff containing at least one hydroxyl group, and $R_2$ represents an acyl radical containing at least one salt-forming group from the group consisting of carboxyl groups and sulfonic groups, which products are water-soluble powders which, when treated with mild saponifying agents, regenerate the parent dyestuff corresponding to the radical $R_1$.

14. The ester-like derivatives of azo-dyestuffs of the general formula

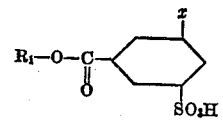

in which $x$ represents a substituent from the group consisting of hydrogen and $SO_3H$, and $R_1$ represents the radical of an azo-dyestuff containing at least one hydroxyl group obtained from a diazotized aminoazo-compound which in addition to the diazonium group contains no other group capable of rendering the dye soluble and an aromatic hydroxy-compound of the benzene series which couples with diazo compounds in ortho-position to the OH-group and carries neither sulfonic groups nor carboxyl groups, which products are water-soluble powders which, when treated with mild saponifying agents, regenerate the parent dyestuff corresponding to the radical $R_1$.

15. The ester-like derivatives of azo-dyestuffs of the general formula

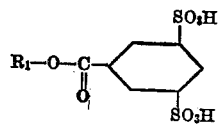

in which $R_1$ represents the radical of an azo-dyestuff containing at least one hydroxyl group obtained from a diazotized aminoazo-compound which in addition to the diazonium group contains no other group capable of rendering the dye soluble and an aromatic hydroxy-compound of the benzene series which couples with diazo compounds in ortho-position to the OH-group and carries neither sulfonic groups nor carboxyl groups, which products are water-soluble powders which, when treated with mild saponifying agents, regenerate the parent dyestuff corresponding to the radical $R_1$.

CHARLES GRAENACHER.
FRANZ ACKERMANN.
HEINRICH BRUENGGER.

DISCLAIMER 2,170,262.—*Charles Graenacher*, Basel, *Franz Ackermann*, Binningen, near Basel, and *Heinrich Bruengger*, Basel, Switzerland. DERIVATIVES OF DYESTUFFS CONTAINING HYDROXYL GROUPS AND PROCESS OF MAKING SAME. Patent dated August 22, 1939. Disclaimer filed November 15, 1939, by the assignee, *Society of Chemical Industry in Basle*.

Hereby disclaims from the scope of each of claims 1 to 10, inclusive, all processes for the manufacture of the claimed dyestuff derivatives except those processes wherein the reaction between the recited dyestuffs and halides (or chlorides) is carried out in a medium which consists substantially of pyridine.

Hereby disclaims from the specification, at page 1, right hand column, lines 46–48, the words "such as by heating the dyestuffs with the acylating agents with or without the addition of agents which bind acid, or preferably" and at page 1, right hand column, line 50, the words "or also indifferent solvents".

[*Official Gazette December 12, 1939.*]